US008140032B2

(12) United States Patent
Russ

(10) Patent No.: US 8,140,032 B2
(45) Date of Patent: Mar. 20, 2012

(54) ANTENNA SYSTEM AND DIAGNOSIS METHOD FOR A VEHICLE ACCESS CONTROL SYSTEM

(75) Inventor: Andreas Russ, Deggenhausertal (DE)

(73) Assignee: Conti Temic Microelectronics GmbH, Nuremberg (DE)

( * ) Notice: Subject to any disclaimer, the term of this patent is extended or adjusted under 35 U.S.C. 154(b) by 730 days.

(21) Appl. No.: 12/159,874

(22) PCT Filed: Dec. 22, 2006

(86) PCT No.: PCT/DE2006/002300

§ 371 (c)(1), (2), (4) Date: Jul. 2, 2008

(87) PCT Pub. No.: WO2007/079711

PCT Pub. Date: Jul. 19, 2007

(65) Prior Publication Data

US 2008/0309566 A1 Dec. 18, 2008

(30) Foreign Application Priority Data

Jan. 9, 2006 (DE) ...................... 10 2006 001 324.7

(51) Int. Cl.
*H04B 1/04* (2006.01)

(52) U.S. Cl. ..................... 455/115.1; 324/522; 343/720; 455/352

(58) Field of Classification Search .................. 455/101, 455/115.1, 115.2, 129, 151.1, 151.2, 352
See application file for complete search history.

(56) References Cited

U.S. PATENT DOCUMENTS

| | | | | |
|---|---|---|---|---|
| 5,654,644 | A * | 8/1997 | Zydek et al. | 324/654 |
| 6,437,577 | B1 * | 8/2002 | Fritzmann et al. | 324/523 |
| 7,126,344 | B2 | 10/2006 | Rocher | |

FOREIGN PATENT DOCUMENTS

| | | |
|---|---|---|
| DE | 10004616 | 8/2001 |
| DE | 10059179 | 6/2002 |
| DE | 10334061 | 3/2005 |
| WO | 2004001681 | 12/2003 |
| WO | WO 2004001681 | * 12/2003 |
| WO | 2004097749 | 11/2004 |

* cited by examiner

*Primary Examiner* — Blane J Jackson

(57) ABSTRACT

An antenna system (10, 11) with a plurality of individual antennae (14) in each case connected in a separate drive path (12), to which a common signal transmitter (16) is assigned, and with a triggering unit (22) provided for selective connecting of a drive path (12) selected in each case in the event of error particularly is to simply and reliably enable identification of a defective individual antenna. For this purpose and according to the invention each drive path (12) between signal transmitter (16) and respective individual antenna (14) is connected electrically via an assigned selecting isolation diode (32) to a common first reference point (34) provided for required tapping of a diagnosis potential.

12 Claims, 5 Drawing Sheets

ANTENNA SYSTEM AND DIAGNOSIS METHOD FOR A VEHICLE ACCESS CONTROL SYSTEM

BACKGROUND OF THE INVENTION

The invention relates to an antenna system with a plurality of individual antennae in each case connected in a separate drive path, to which a common signal transmitter is assigned, and with a triggering unit provided for selective connecting a drive path selected in each case. It also relates to an access control system for a vehicle with such an antenna system as well as a method for detecting a defective individual antenna in such an antenna system.

Vehicles can be fitted with so-called "Keyless Entry" systems for raising user comfort and also for increasing theft security, in which keyless opening and closing of the central locking and if required also additional releasing of the engine immobiliser can occur by means of a transponder or a mobile identification transmitter. In such systems a control system of the vehicle communicates via coded signals with the respective identification transmitter, whereby for example on receipt of corresponding signals from the information transmitter and their evaluation in case of positive identification of an authorised user corresponding releasing of the central locking and/or for releasing the engine immobiliser or the like can be issued.

For communication with the identification transmitter or transponder the control system transmits appropriate signals to the latter. Signal transmission occurs at the same time usually via a suitable antenna system integrated into the vehicle. Due to the large number of possible applications and individual cases to be considered is provided usually a multichannel antenna system at the same time, in which a plurality of satisfactorily designed individual antennae, if required also arranged in the vehicle, in each case connected in a separate drive path, is used. The individual antennae can on the one hand for example be so-called internal and on the other hand so-called external antennae, whereby their range and the like can be specifically detected via an internal antenna based on its arrangement in the vehicle as to whether the respective identification transmitter or transponder is currently in the vehicle interior itself. In the case however of an external antenna the individual antenna provided therefor with respect to dimensioning and positioning for communication with the identification transmitter or trans-ponder is configured for the case where the latter is located on the exterior of the vehicle. To be able to consider another dependence on direction or the like at the same time if required, a plurality of such specialised antennae can be provided in the antenna system in addition both in the Interior region and also in the exterior region.

An antenna system of this type, in which the individual antennae are assigned a common signal transmitter for required communication with the identification transmitter or transponder, whereby selective activation or connecting a desired situation-dependent individual antenna by selecting its respective drive path via a central triggering unit is provided, is known for example from DE 10 2004 058 613 A1. This system receives reliable supply of transmission signals to the antennae in particular using comparatively simple means, whereby unwanted coupling or crosstalk effects can be reliably prevented.

However, as it has eventuated, basically with antenna systems of the above-mentioned multichannel structure in the event of error, therefore when one or more of the individual antennae drop out, error search is comparatively complicated, therefore identification of the defective antenna in particular. In particular, repair expenses in the event of breakdown can be undesirably high.

The object of the invention therefore is to further develop an antenna system of the abovementioned type, such that particularly simply reliable identification of a defective individual antenna is enabled in the event of error. A particularly favourable method for detecting a defective individual antenna in such an antenna system will also be specified.

SUMMARY OF THE INVENTION

With respect to the antenna system this task is solved according to the invention by each drive path between signal transmitter and respective individual antenna being connected electrically via an assigned isolation diode to a first common reference point provided for required tapping of diagnosis potential.

The invention is at the same time based on the consideration that for particularly easily maintained and focussed identification of a defective individual antenna at first the type of error or the error type can be determined jointly for all individual antennae, so that in a subsequent second step based on the recognised error type particularly focussed identification of the respectively defective individual antenna can take place. Appropriate inference of the present error type should accordingly be drawn in the form of group diagnosis at first jointly for all individual antennae. At the same time in particular short circuit of the respective individual antenna to the supply voltage, short circuit of the respective individual antenna to earth or a so-called "Open Load" state, therefore interruption of the electrical connection within the respective antenna are considered as error types. For recognising the error type it is therefore provided in a first step to determine jointly for all individual antennae whether a short circuit to the supply voltage might possibly be present as error type. To enable this, on the input side, therefore in the vicinity of their so-called positive antenna pole, all individual antennae are connected suitably electrically to one another and to a reference point, via which a short circuit to the supply voltage can be suitably made. For detecting whether there might be a short circuit to the supply voltage the electrical potential of the reference point relative to earth is then measured in the load-free state. If an adjoining voltage greater than zero is applied at the same time between the reference points, preferably connected to earth via an appropriate resistor and earth, an error type of short circuit to the supply voltage can be assumed. The isolation diodes, which during operation prevent crosstalk of the individual drive paths with one another, are provided on the one hand to be able to simply carry out this first step of group diagnosis, whereby on the other hand the electric disconnecting of the individual antennae from one another is to be guaranteed during operation.

By way of advantage the antenna system should also be suitably configured such that reliable type recognition is also enabled for other possible error types in terms of group diagnosis, specifically short circuit to earth and "Open Load" state, before identification of the respective defective individual antenna is made. To enable fixing a short circuit to earth, at the same time each drive path between signal transmitter and respective individual antenna is connected preferably electrically via an assigned feed isolation diode to a common, for required application of test voltage provided contact point. In applying test voltage to the contact point specifically for an error-free installation also at the first reference point voltage relative to earth should be measurable. Only in the event of a short circuit to earth is this voltage also zero with applied test voltage. The isolation diodes at the same time again prevent unwanted crosstalk between the drive paths. The feed isolation diode is at the same time preferably connected in the connection between drive path and contact such that the connection contact point-drive path of the forward current and the connection drive path-contact point corresponds to the reverse current of the feed isolation diode.

In order to further be able to identify the error type "Open Load", each drive path in the return area of the respective individual antenna, therefore in the region of the so-called negative pole of the respective individual antenna, is advantageously connected electrically with a common second reference point provided for required tapping of a diagnosis potential likewise via an assigned isolation diode. Via tapping of the diagnosis potential at the second reference point, which on the one hand is preferably connected electrically with earth via a suitable resistor, at the same time the antenna current of the individual antennae in particular can be measured particularly easily, which can be used as a particularly suitable criterion for verifying a short circuit to earth or for identifying an "Open Load" state.

Selective activation of the separately maintained drive paths and thus the respective individual antennae can occur for example via appropriately designed relay arrangements or also via appropriately selected signal transmitters. A particularly easily maintained and reliable actuation of the individual drive paths and thus of the individual antennae by using a common signal transmitter can be achieved however, by the triggering unit being formed as multiplexer, preferably as multiplexer transistor or shunt multiplexer, in a particularly advantageous configuration.

The antenna system in an access control system for a vehicle is used in a particularly advantageous configuration, whereby the signal exchange of a control system integrated into the vehicle takes place with a mobile identification transmitter via the abovementioned antenna system.

With respect to the method for detecting a defective individual antenna in such an antenna system the abovementioned task is solved by a general error type being detected in a first diagnostic step by measuring a diagnosis potential at the first reference point and if required at the second reference point. In terms of group diagnosis in a first diagnostic step this ensures basic recognition of the error type, so that in the following individual diagnosis steps, in which the individually defective antenna is detected, a test program adapted to the currently present error type can be run. In the first step of the abovementioned group diagnosis particular provision is made at the same time at first in the load-free state for ascertaining the diagnosis potential at the first reference point relative to earth. If at the same time a potential greater than zero is at the first reference point, the error type of a short circuit to the supply voltage can thus be assumed. If however in the process diagnosis voltage different to zero cannot be ascertained at the first reference point, test voltage different to zero can be applied specifically to the positive poles of the individual antennae.

With test voltage via the contact point applied to the positive poles of the individual antennae a diagnosis potential different to zero should be present at the first reference point in the error-free state also. If however a diagnosis potential of zero is measured in this state at the first reference point, in the group diagnosis step the presence of a short circuit to earth as error type can be assumed from this.

After the present error type was detected in the first diagnostic step in terms of group diagnosis at first for all antennae, detecting of the individual defective individual antenna is advantageously provided in a following second diagnostic step based on error-type—specific test measures. For this, each drive path is advantageously and selectively selected sequentially via the triggering unit and supplied with suitable test signals, for example a signal from the signal transmitter. With suitable evaluation of the diagnosis potentials measured the faultiness of the individual antenna can be assumed at the same time at the reference points.

The advantages achieved by the invention comprise in particular that reliable identification of an individual antenna is enabled for an antenna system of the above-mentioned type by aligning the error identification with group diagnosis with particularly easily maintained construction and minimally maintained componentry expenditure. Through use of isolation diodes, which ensure reliable disconnection of the individual drive paths from one another, detecting of the respective upstream error type for the entire antenna system and subsequent individualised error search using particularly suitable test measures is enabled at the same time. This results in complete diagnosability of the individual antennae of the antenna system with particularly minimal structural expense and also minimal footprint on the respective component blanks. Such diagnosability is therefore possible also for other multichannel antenna systems, in which the individual antennae are supplied by suitable individual signal transmitters at the positive or negative pole.

BRIEF DESCRIPTION OF THE DRAWINGS

An embodiment of the invention will be explained in greater detail by means of a diagram, in which.

DETAILED DESCRIPTION OF THE DRAWINGS

Figure 1:
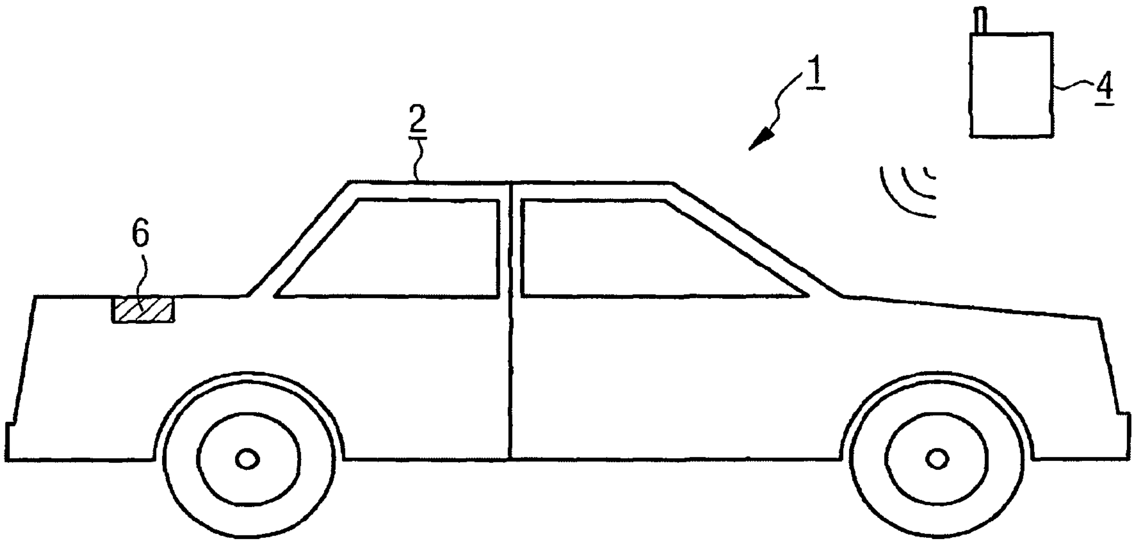
FIG. 1 illustrates an access control system for a vehicle.

Identical parts are provided in all figures with the same reference numerals.

The access control system 1 according to FIG. 1 is provided for wireless release of authorisation for access or for operating a vehicle 2 and can be configured in particular as so-called "Keyless Entry" system for keyless opening and closing of the central locking of the vehicle 2. For this purpose the access control system 1 comprises a mobile identification transmitter 4, which exchanges signals with a control system 6 arranged in the vehicle 2 via wireless mode, for example via a suitably selected radio link. The control system 6 at the same time comprises an integrated evaluation module, not described in greater detail, in which a code of the received signal is evaluated individually via correspondingly backed software, whereby in case of a positive result of this evaluation of the received signal correct identification and thus authorisation of the user are assumed. In case such authorisation is recognised, the central locking of the vehicle 2 is activated for example.

Such activation or deactivation of the central locking of the vehicle 2 can however be made dependent on a number of factors. By way of example, it could be assumed for security reasons to lock the central locking system of the vehicle 2, whenever the mobile identification transmitter 4 is located inside the vehicle 2. The access control system 1 is therefore inter alia configured, due to communication of the control systems 6 with the mobile identification transmitter 4 to distinguish between different states, to which different releases of authority are assigned. To enable this the access control system 1 comprises inter alia a plurality of antennae, via which communication with the mobile identification transmitter 4 proceeds. If at the same time for example it is ascertained that communication with the mobile identification transmitter 4 occurs via an internal antenna of the access control system 1, locking the vehicle doors can be cancelled actively.

Figure 2:
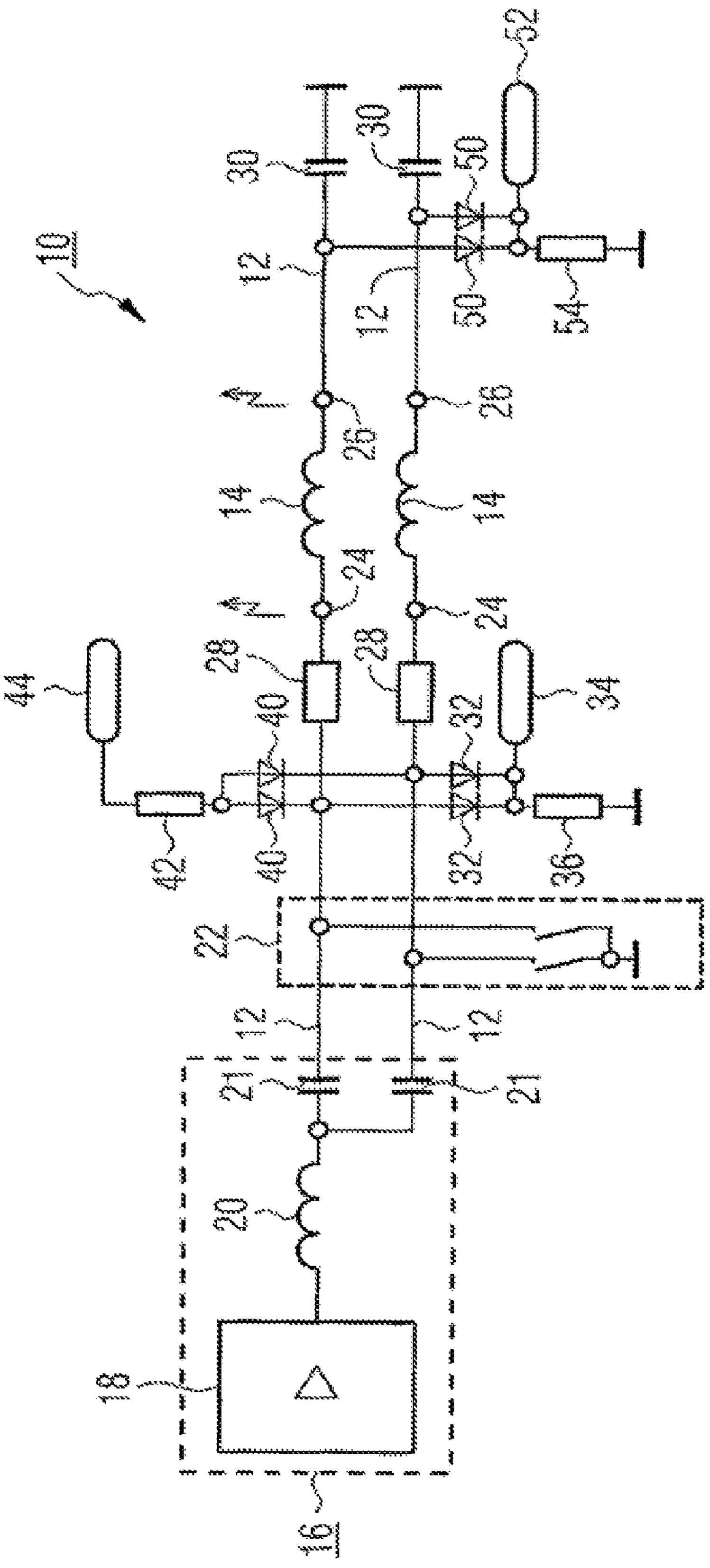
FIG. 2 schematically illustrates an antenna system.

For signal exchange with the mobile identification transmitter 4 the control system 6 is therefore provided with a multichannel antenna system 10, as illustrated schematically in FIG. 2. The antenna system 10 also includes a plurality of individual antennae 14 in each case connected in a separate drive path 12, of which only two are shown in the embodiment in FIG. 2 for the sake of clarity. The antenna system 10 may of course also include more than two separate drive paths 12, for example five, eight or more, with corresponding individual antennae 14.

On the signal input side the drive paths 12 are connected to a common signal transmitter 16, which can in addition to an actual signal generator 18 for the provided signal data, protocols or the like include more components, such as for example a coupling coil 20 and coupling condensers 21 connected in the respective drive path 12, or the like. For selective connecting of a selected drive path 12, therefore for required selective connection of one of the drive paths 12 to the signal transmitter 16, a triggering unit 22 is further provided, which is designed in the embodiment as a multiplexer, in particular as a multiplexer transformer or shunt multiplexer. The signal transmitter 16 and the triggering unit 22 are connected inside the respective drive path 12 in each case via the resistor 28 to the so-called positive pole 24 of the respective individual antenna 14.

In the return area, therefore via its so-called negative pole 26, each individual antenna 14 is connected within its drive path 12 in each case to an isolating condenser 30, which separates the negative pole 26 of the respective individual antenna 14 from earth.

The resistor 28 serving to set the antenna Q value can also be inserted into the respective drive path 12 before the above-mentioned isolating condenser 30. The coupling condenser 21 and the isolating condenser 30 are components of the antenna circuit (21, 14, 28, 30).

The antenna system 10 is configured for the case of error, therefore in case of dropout of one or more of the individual antennae 14, for particularly targeted and easily maintained error identification and identification of the defective individual antenna 14. For this, each drive path 12 is connected electrically via an assigned selecting isolation diode 32 to a common first reference point 34 in the region of the positive pole 24 of the respective individual antenna 14, therefore between signal transmitter 16 and respective individual antenna 14. The first reference point 34 is connected to earth at the same time via a resistor 36. The selecting isolation diodes 32 are at the same time connected such that the connection from the drive path 12 to the first reference point 34 corresponds to the forward current and the connection from the first reference point 34 to the drive path 12 corresponds to the separation direction of the selecting isolation diode 32.

In addition, the positive pole 24 of each individual antenna 14, therefore the region between signal transmitter 16 and respective individual antenna 14 of each drive path 12, is electrically connected via an assigned feed isolation diode 40 and a resistor 42 to a common contact point 44. The feed isolation diodes 40 are at the same time configured such that the connection from the contact point 44 to the respective drive path 12 corresponds to the forward current and the connection from the respective drive path 12 to the contact point 44 of the separation direction of the respective feed isolation diode 40.

On the discharge side, therefore via its respective negative pole 26, each drive path 12 of the respective individual antennae 14 is connected electrically via an assigned selecting isolation diode 50 to a common second reference point 52. The second reference point 52 is connected to earth by way of a resistor 54. The selecting isolation diodes 50 are at the same time again configure such that the connection from the drive path 12 to the second reference point 52 corresponds to the forward current and the connection from the second reference point 52 to the drive path 12 corresponds to the reverse current of the respective selecting isolation diode.

For error identification in the event of error, therefore for detecting that individual antenna 14 operating in fault the antenna system 10 is configured for gradual diagnosis, in which in a first diagnostic step in terms of group diagnosis the present error type is detected jointly at first for all individual antennae 14, before the defective individual antenna 14 is detected in a second diagnostic step by means of the determined error type based on suitable test measures. Basic examples of error types are the error types "short circuit to supply voltage", "short circuit to earth" and "Open Load" state, whereby the "Open Load" state corresponds to electrical severing of the respective individual antenna 14, therefore a defective electrical connection between the positive pole 24 and the negative pole 26 of the respective individual antenna 14.

Figure 3:
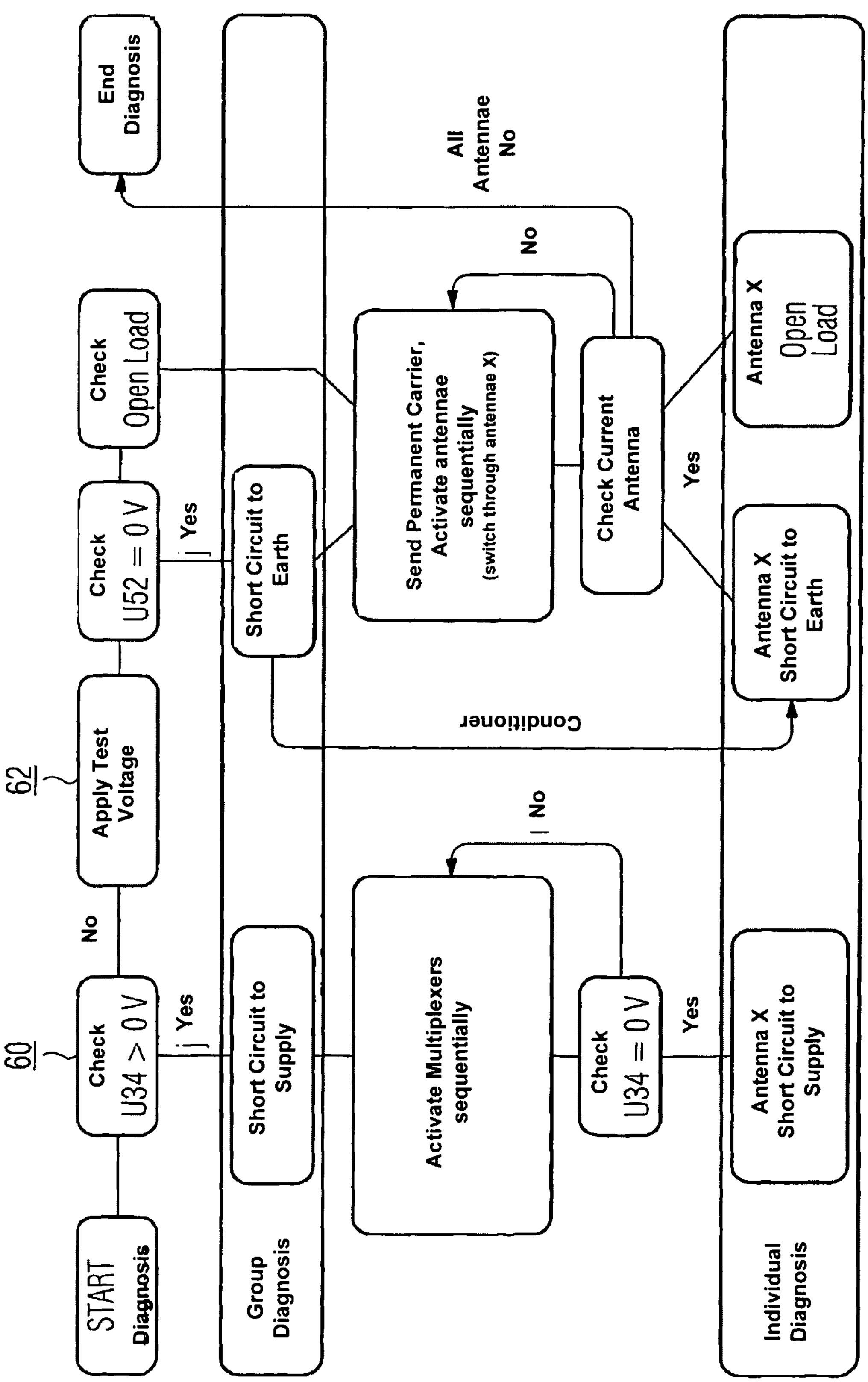
FIG. 3 illustrates a flowchart for the sequence of a method for error identification.

The procedure for detecting a defective individual antenna 14 using group diagnosis in detecting the error type at the same time according to a testing diagram is as shown in the flowchart according to FIG. 3. Initially, in a first testing step 60 in load-free state, therefore when both signal transmitter 16 and triggering unit 22 are inactive, it is ascertained as to whether voltage is measurable between the first reference point 34 and earth as diagnosis potential. If this is the case, then "short circuit to supply" is assumed as the result of group diagnosis as error type.

For this case in terms of individual diagnosis each drive path 12 is then sequentially activated briefly via the triggering unit 22, where the coupling condenser 21 is switched to earth at the drive path 12 in each case. If at the same time an error-free individual antenna 14 of the respective drive path 12 is connected, the voltage measured as diagnosis potential between first reference point 34 and earth because of disconnecting by the selecting isolation diodes 32 is not altered. If on the other hand the drive path 12 with the defective individual antenna 14 is activated via the triggering unit 22, the voltage measured as diagnosis potential at the first reference point 34 is reset to zero due to the earth coupling of the multiplexer. As soon as this case ensues the currently activated individual antenna 14 is thus identified as the defective individual antenna 14.

But if no voltage can be measured between first reference point 34 and earth in the first testing step 60, test voltage is applied to the contact point 44 in terms of group diagnosis in a following testing step 62. A check is then made as to whether voltage is measurable between the first reference point 34 and earth from here on as diagnosis potential. In case no voltage between first reference point 34 and earth can be measured, in terms of group diagnosis the error type "short circuit to earth" is assumed. In this case, in terms of the following individual diagnosis it can now be determined which of the individual antennae 14 has the short circuit to earth.

For this purpose a permanent signal is output via the signal transmitter 16. Next, the drive paths 12 are selectively connected sequentially via the triggering unit 22. For checking the proper procedure of the respective individual antenna 14 at the second reference point 52 a check is made at the same time as to whether voltage relative to earth can be fixed as diagnosis potential. This voltage would then correspond to the antenna current via the respective individual antenna 14. If such antenna current corresponding to voltage between second reference point 52 and earth is measurable, then proper procedure of the respective individual antenna 14 is assumed. If the antenna current however equals zero, the currently connected individual antenna 14 is identified as defective individual antenna 14.

But if in terms of group diagnosis the error type "short circuit to earth" could not be assumed, finalising of group diagnosis of error type "Open Load" is alleged. In terms of the following individual diagnosis for each individual antenna 14 a sequential check is made as to whether a corresponding antenna current can be proven by supplying the respective individual antenna 14 with a test pulse. A permanent signal is accordingly output again via the signal transmitter 16. Next, all drive paths 12 selectively are connected sequentially via the triggering unit 22, whereby a check is made in each case for the current individual antenna 14 by means of measuring voltage between second reference point 52 and earth as to whether an antenna current can be proven. If at the same time no voltage can be measured between second reference point 52 and earth for an individual antenna 14 as diagnosis potential, the current individual antenna 14 is identified as defective individual antenna 14.

With group diagnosis, testing step 60 the test voltage can be applied to the contact point 44 however also right at the beginning. Half the test voltage is accordingly present in the non-event of error, for example. Depending on case of error, short circuit following supply or short circuit to earth, the reference voltage 34 is set more or less than the half test voltage for example.

Figure 4:
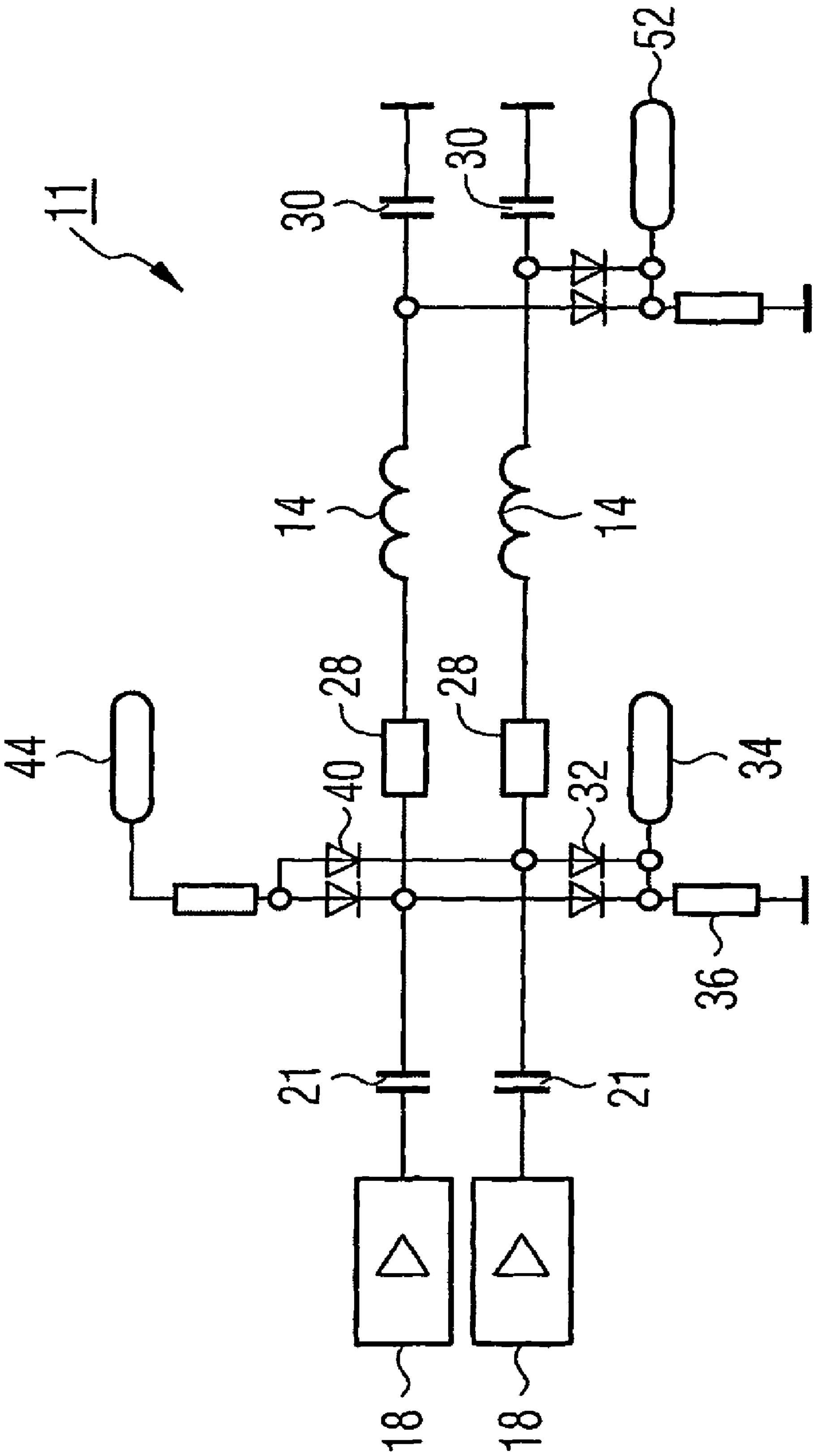
FIG. 4 illustrates an alternative antenna system.

FIG. 4 shows an alternative antenna system 70, likewise having a multichannel structure, whereby however each drive path 12 is in each case assigned a separate signal transmitter 18. Group diagnosis is performed at the same time substantially similarly to the antenna system 10, whereby individual diagnosis is done by selective sending over individual antennae 14, therefore by selective activation of the individual signal transmitter 18, and signal feedback at the reference point 52.

Figure 5:
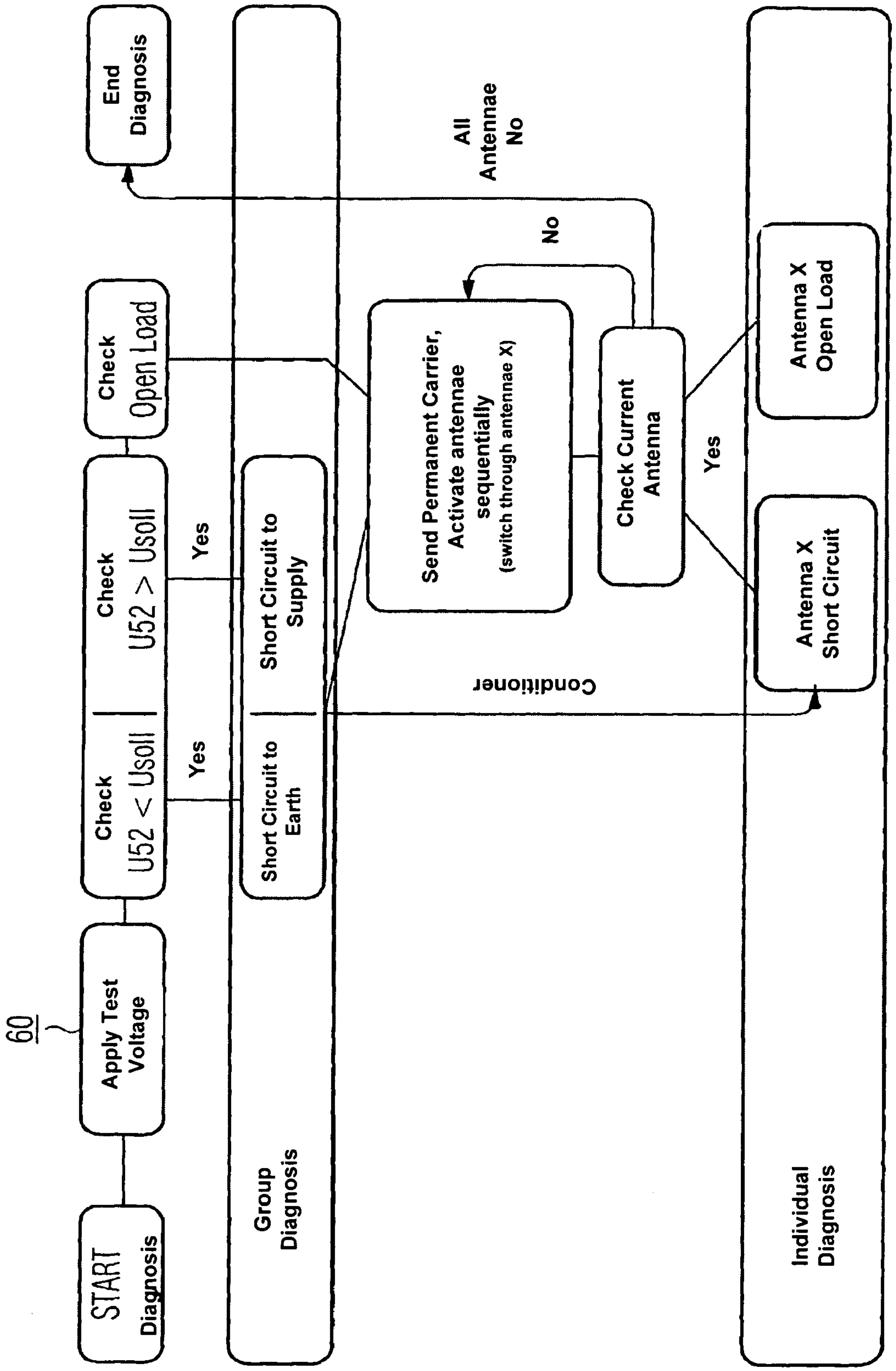
FIG. 5 illustrates a flowchart for the sequence of a method for error identification according to FIG. 4.

A flowchart for carrying out diagnosis in this antenna system is shown in FIG. 5.

Legend

1 access control system
2 vehicle
4 mobile identification transmitter
6 control system
10, 11 multichannel antenna system
12 drive path
14 individual antennae
16 signal transmitter
18 signal generator
20 coupling coil
21 coupling condenser
22 triggering unit
24 positive pole
26 negative pole
28 resistor
30 isolating condenser
32 selecting isolation diode
34 first reference point
36 resistor
40 feed isolation diode
42 resistor
44 contact point
50 selecting isolation diode
52 second reference point
54 resistor
60 first testing step
62 following testing step
70 antenna system

The invention claimed is:

1. An antenna system comprising:
a plurality of individual antennae,
each antenna electrically connected in a respective separate drive path; and
a triggering unit electrically connected in each drive path to a common signal transmitter;
the triggering unit configured to selectively activate each drive path,
each drive path comprising a first side, each first side at a first electrical connection of the respective antenna,
each first side electrically connected to a common first reference point via a respective first selecting isolation diode.

2. The antenna system of claim 1, wherein each first side is further electrically connected to a common contact point via a respective feed isolation diode.

3. The antenna system of claim 1, wherein each drive path further comprises a second side,
each second side at a second electrical connection of the respective antenna, the second electrical connection of the respective antenna being different from the first electrical connection of the respective antenna,
each second side electrically connected to a common second reference point via a respective second selecting isolation diode.

4. The antenna system of claim 1, wherein the triggering unit is a multiplexer.

5. The antenna system of claim 4, wherein the multiplexer is a shunt multiplexer.

6. An access control system for a vehicle comprising:
a control system comprising an antenna system configured to exchange signals with a mobile identification transmitter,
the antenna system comprising a plurality of individual antennae,
each antenna electrically connected in a respective separate drive path; and
a triggering unit connected in each drive path to a common signal transmitter;
the triggering unit configured to selectively activate each drive path,
each drive path comprising a first side, each first side at a first electrical connection of the respective antenna,
each first side electrically connected to a common first reference point via a respective first selecting isolation diode.

7. A method for detecting a defective individual antenna in an antenna system comprising a plurality of individual antennae, the method comprising:

detecting a general error type by measuring a first diagnosis potential at a common first reference point in an antenna system comprising a plurality of individual antennae, each antenna electrically connected in a respective separate drive path, and a triggering unit electrically connected in each drive path to a common signal transmitter, the triggering unit configured to selectively activate each drive path, each drive path comprising a first side, each first side at a first electrical connection of the respective antenna, each first side electrically connected to the common first reference point via a respective first selecting isolation diode.

8. The method as claimed in claim 7, further comprising identifying the defective individual antenna by selectively activating a drive path and evaluating a respective diagnosis potential.

9. The method as claimed in claim 7, wherein each drive path comprises a second side, each second side at a second electrical connection of the respective antenna, the second electrical connection of the respective antenna being different from the first electrical connection of the respective antenna, and wherein each second side is electrically connected to a common second reference point via a respective second selecting isolation diode; further comprising detecting a general error type by measuring a second diagnosis potential at the second reference point in the antenna system.

10. The method as claimed in claim 9, further comprising identifying the defective individual antenna by selectively activating a drive path and evaluating a respective diagnosis potential.

11. The method of claim 7, wherein the wherein the triggering unit is a multiplexer.

12. The method of claim 11, wherein the multiplexer is a shunt multiplexer.

* * * * *